Figure 1:
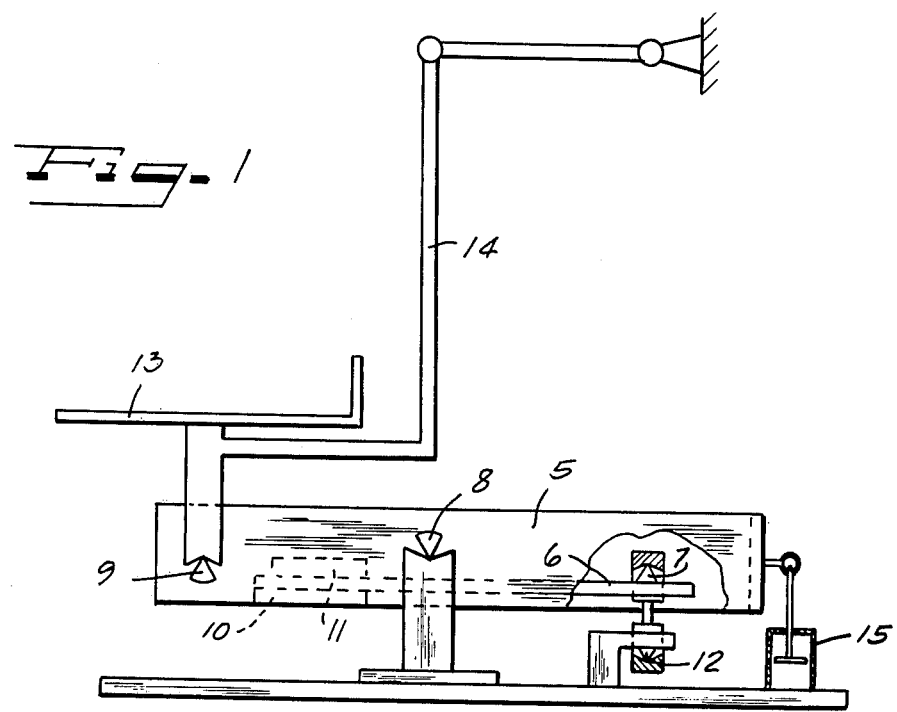

United States Patent [19]
Nyholm

[11] 4,036,318
[45] July 19, 1977

[54] SHOP SCALES WITH DIGITAL WEIGHT INDICATION

[76] Inventor: Jarl Nyholm, Vespertie 6, 00320 Helsinki 32, Finland

[21] Appl. No.: 578,096

[22] Filed: May 16, 1975

[30] Foreign Application Priority Data

May 21, 1974 Finland .................................. 741557

[51] Int. Cl.² ............................................. G01G 3/14
[52] U.S. Cl. ..................................... 177/211; 177/246
[58] Field of Search ............... 177/211, 255, 246, 229, 177/201, 170, 230

[56] References Cited
U.S. PATENT DOCUMENTS 1,463,249 7/1923 Burrows ................................. 177/246
3,667,560 6/1972 Cooke ................................... 177/211
3,967,691 7/1976 Wirth ..................................... 177/230

Primary Examiner—Joseph W. Hartary
Attorney, Agent, or Firm—Hill, Gross, Simpson, Van Santen, Steadman, Chiara & Simpson

[57] ABSTRACT

This invention relates to shop scales with digital weight indication. The scales comprise a balance lever, knife edge supports, directional supports and a damper, the balance being carried by two pairs of knife edges lying in the same plane, a pick-up arm and means directly supporting the pick-up arm from the balance lever and with the pick-up arm being deflectable, the deflection of which is converted in a manner previously known in itself into a digital display with the aid of strain gauge strips.

5 Claims, 4 Drawing Figures

SHOP SCALES WITH DIGITAL WEIGHT INDICATION

The present invention concerns shop scales with digital weight indication and comprising a balance lever with knife edge supports, directional supports and damper.

As can be read e.g. from the British Pat. No. 1,263,182, strain gauge strips have been used for obtaining a digital display of the weight indication. In order that the indication be correct, the straining of the strips has to be arranged to take place as uniformly as possible. The greater problem in such connections has in fact been the circumstance that the pick-up arm, to which the strain gauges are attached, while bending also undergoes some torsion at the same time, because the load acting on it is not uniformly directed against the arm. In the scales of the said British Patent, the goods to be weighed are placed on the weighing stage, which is connected by parallel arms with a plate-like member serving as pick-up arm. The weighing stage is additionally braced with the aid of parallel supports and with an oscillation damper.

If now in scales of this type the goods to be weighed are not placed in the centre of the weighing stage but on its marginal area, the consequence is that one edge of the pick-up arm is subjected to a higher deflected, but it is also warped at the same time. This torsional deformation introduces an error in the display.

By using a planar arm according to the invention, which is carried with the aid of knife-edges, the said error in the display is avoided. The scales according to the invention may be provided with a weighing stage of even large size and the goods to be weighed may be placed at any point on the weiging stage.

From the U.S. Pat. No. 3,501,951 a force pick-up design is known werein the bending of a lever arm as a function of the force acting on the pick-up can be observed with the aid of strain gauges. From the Finnish Pat. No. 45 099, too, a force pick-up is known in wich strain gauge strips are utilized. In these applications, however, a point load is concerned.

But up to date no such design principle has been disclosed which could be applied as such in common shop scales. Shop scales must operate under various conditions, in which the temperatures and humidity vary quite considerably. It is an absolute requirement imposed on shop scales that the indication is correct in every case. Since the weighing stage of the shop scales is frequently quite large, this imposes particular requirements on the design, and the solutions of prior art presented above are not usable as such for obtaining a completely reliable result. The object of the present invention is to provide shop scales wherein strain gauge strips can be utilized to gain a digital display of the weighing indication and which display is also faultless in conditions of actual practice. The present invention therefore aims to produce shop scales in which strain gauges can be utilized.

The invention is characterized in that to the balance lever, which is carried by two pairs of knife edges lying in the same plane, there has directly or by mediation been connected a pick-up arm, the deflection of which is converted in a manner known in itself into a digital display with the aid of strain gauge strips.

By using a planar arm having the shape of a frame, whereby the goods to be weighed bends the pick-up arm by mediation of two pairs of knife edges, the effect exerted on the pick-up arm by the weight on the weighing stage can be equalized and suitably damped.

It is further a characteristic feature of the invention that one end of the pick-up arm has been fixedly attached to a transverse plate of the planar arm and the other end of the arm is supported by means of a knife edge on the arm and a knife edge at a fixed point.

It is moreover a characteristic feature of the invention that one end of the pick-up arm has been fixedly attached to a point of support and the other end of the arm connects by mediation of a knife edge thereon and of a pull rod with the member supporting the planar arm.

By the design principles presented above, a highly compact structure is achieved, which is not susceptible to disturbances.

Figure 2:
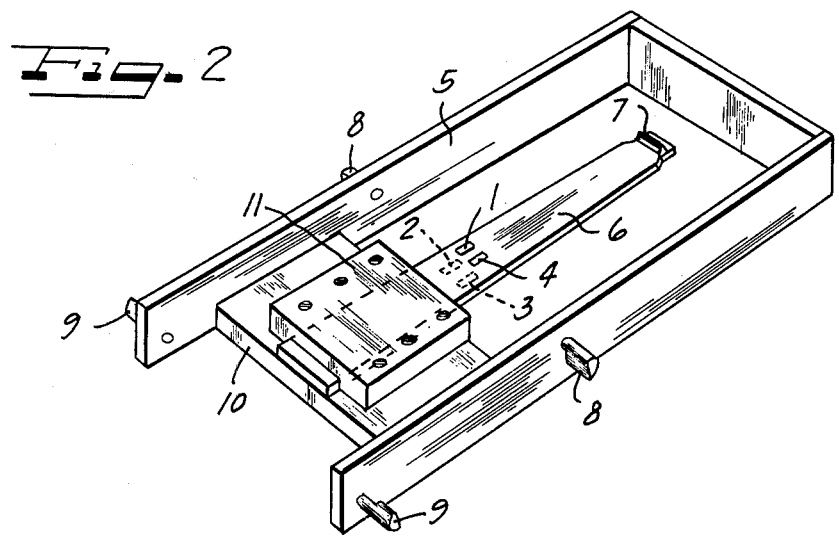
Figure 3:
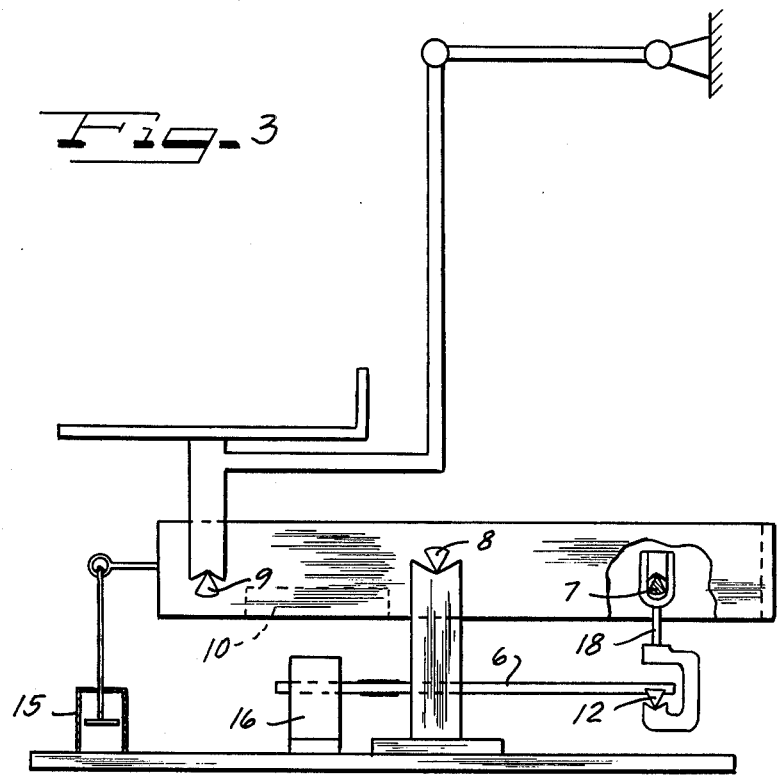
Figure 4:
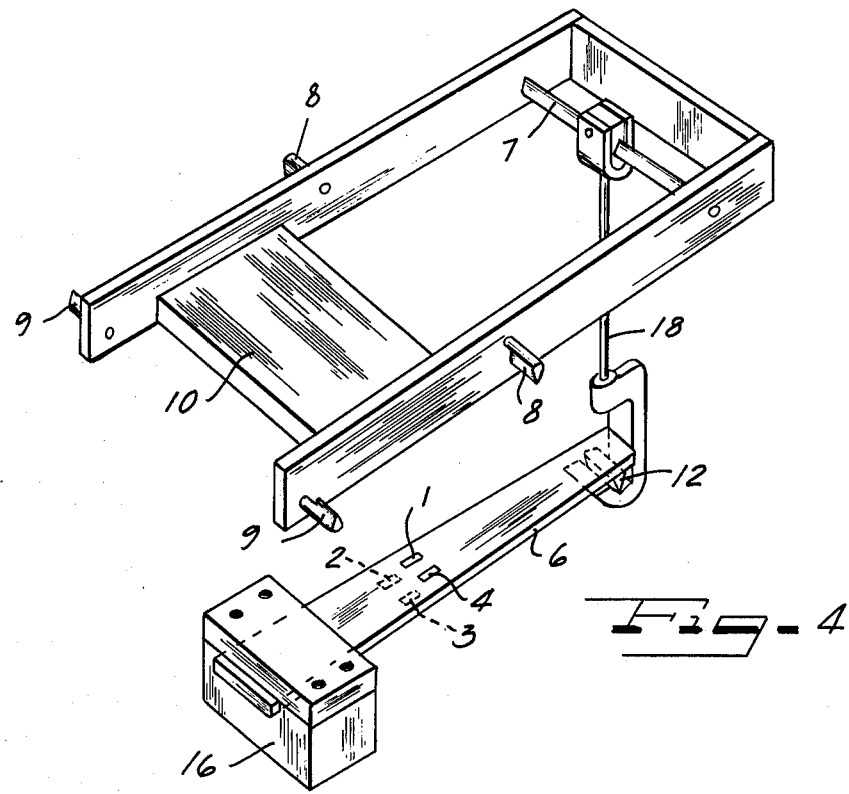

The invention is more closely described with reference to the attached drawings, wherein FIG. 1 shows an embodiment of the invention, FIG. 2 shows the planar arm design according to the invention, with its pick-up arm, FIG. 3 shows another principle of embodiment of the invention, FIG. 4 shows the planar arm design of FIG. 3 with its pick-up arm.

The scales of FIG. 1 have been provided with a weighing stage 13 and with parallel braces 14 commonly used in shop scales. The weighing stage 13 rests by mediation of knife edges 9 on one end of the frame-like planar arm 5. It will be seen in FIG. 1 that the vertex points of the knife edges 7, 8 and 9 lie in one and the same plane.

The planar arm has, furthermore, second external knife edges 8, by which the planar arm rests on the base of the scales. On the planar arm between the knife edges 9 and 8 a transverse plate 10 has been mounted, to which the pick-up arm 6 has been attached by the aid of the fixing plate 11. Between the fixing point and the knife edge 7 at the end, four strain gauge elements 1 to 4, in themselves known in prior art, have been placed and these have been connected to constitute a Wheatstone bridge. By this circuit it is possible to compensate the effects of ambient temperature variations. The knife edge 7 at the end is connected by means of a pull rod with the knife edge 12 at the fixed point on the base of the scales.

When the object to be weighed is placed on the weighing stage 13, the entire planar arm swivels about the pivotal point constituted by the knife edges 8. The end of the planar arm adjacent to the knife edges 9 descends and at the same time, of course, the fixing plate 10 and the fixed end of the pick-up arm 6. The other, free end of the planar arm 5 is free to move upwardly, but the corresponding end of the pick-up arm cannot move, owing to the stop meeting the knife edge 7, and the pick-up arm is bent.

In FIGS. 3 and 4 an embodiment as in FIGS. 1 and 2 is seen, through with the difference that here one end of the pick-up arm 6 has been fixedly attached to a fixing piece 16 on the base of the scales. The other end of the pick-up arm 6 carries on its underside a knife edge 12, which connects by means of a pull rod 18 with the knife edge member 7 on the planar arm.

In other respects the embodiment presented here conforms to the preceding design, and it is understood that the planar arm 5 also has been fitted with knife edges 8, supported by which the planar arm swivels, and with weight-accepting knife edges 9. In this case, too, the planar arm has been provided with a transverse plate 10, which imparts rigidity to the arm structure.

While in the embodiment of FIGS. 1 and 2 the fixed end of the pick-up arms is downwardly reflected, in the embodiment seen in FIGS. 3 and 4 the free end of the pick-up arm is deflected upward.

In order that potential oscillations or irregular movements of the planar arm 5 might be avoided, a damper 15 has been connected to the planar arm in both embodiments.

I claim:

1. A shop scale for digital indication of weight, comprising:
   a. a balance lever;
   b. a support means;
   c. a first pair of knife edges carrying the balance lever on the support means;
   d. a second pair of knife edges on the balance lever;
   e. a weighing platform acting on the second knife edges to deflect the balance lever;
   f. a transverse plate attached to said balance lever;
   g. a pick-up arm having a planar surface with strain gauge means mounted thereon for measuring bending of the pick-up arm;
   h. one end of the pick-up arm being rigidly attached to said transverse plate;
   i. stop means attached to said support means, the other end of said pick-up arm engaging with said stop means and thereby preventing deflection;
   whereby said other end of said pick-up arm is isolated from torsional effects caused by loads on the weighing platform.

2. The shop scale of claim 1 wherein the other end of said pick-up arm has a third knife edge which engages said stop means.

3. The shop scale of claim 1 in which said balance lever is a frame member and said pick-up arm is mounted within the frame member.

4. A shop scale for digital indication of weight, comprising:
   a. a balance lever;
   b. a first support means;
   c. a first pair of knife edges carrying the balance lever on the support means;
   d. a second pair of knife edges on the balance lever;
   e. a weighing platform acting on the second knife edges to deflect the balance lever;
   f. a pick-up arm having a planar surface with strain guage means mounted thereon for measuring loading of the pick-up arm;
   g. a second support means;
   h. one end of the pick-up arm being rigidly attached to the second support means;
   i. a linking means having one end attached to said balance lever and another end engaging the other end of said pick-up arm;
   whereby when said weighing platform acts on said second pair of knife edges said linking means deflects said other end of the pick-up arm, said pick-up arm being isolated from torsional effects caused by loads on the weighing platform.

5. The shop scale of claim 4 wherein said other end of the pick-up arm has a knife edge which engages said linking means.

* * * * *